(Model.)

W. P. B. DECKER.
TILE DRAIN DITCHING MACHINE.

No. 295,909. Patented Apr. 1, 1884.

Witnesses.
T. J. Thompson
J. C. Jensen

Inventor
William P. B. Decker

UNITED STATES PATENT OFFICE.

WILLIAM P. B. DECKER, OF FRANKLIN GROVE, ILLINOIS.

TILE-DRAIN DITCHING-MACHINE.

SPECIFICATION forming part of Letters Patent No. 295,909, dated April 1, 1884.

Application filed September 6, 1882. (Model.)

*To all whom it may concern:*

Be it known that I, WILLIAM P. B. DECKER, a citizen of the United States, and a resident of Franklin Grove, in the county of Lee and State of Illinois, have invented certain new and useful Improvements in Tile-Drain Ditching-Machines, of which the following is a specification.

The object of my invention is to construct a tile-drain ditching-machine (or plow) that will make the ditch, deposit the tile in its proper place in the ditch, and cover up the tile-drain and the ditch, all by going over the ground once. This object is attained in the manner hereinafter described.

The machine consists, chiefly, of a mold-board, four guards riveted on the mold-board, three colters in front of the guards, a shoe or tube fastened on the bottom and near the front of said mold-board, a main beam resting on a truck, and a tube or trough for depositing the tile.

Figure 1:
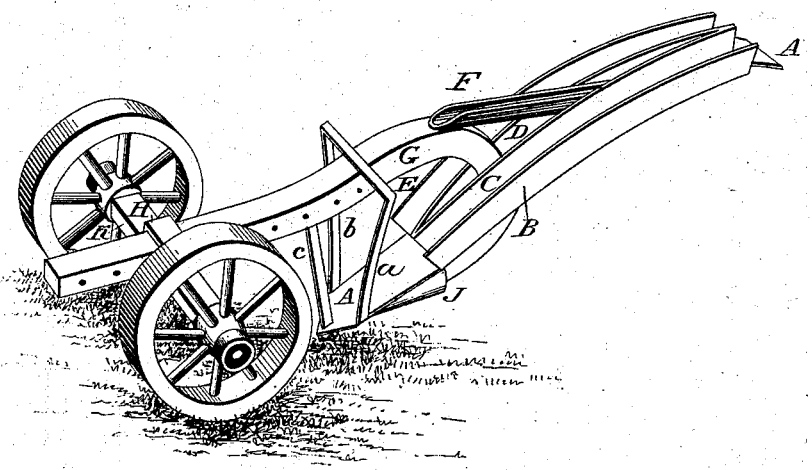
Figure 2:
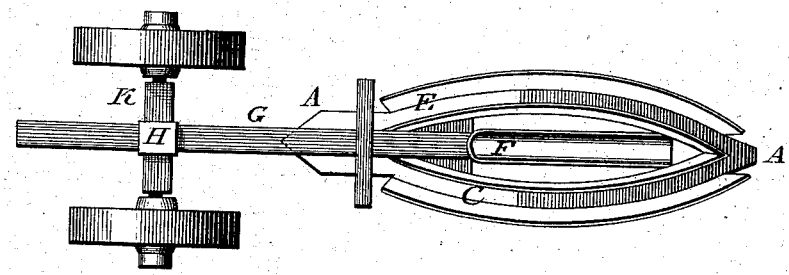
Figure 3:
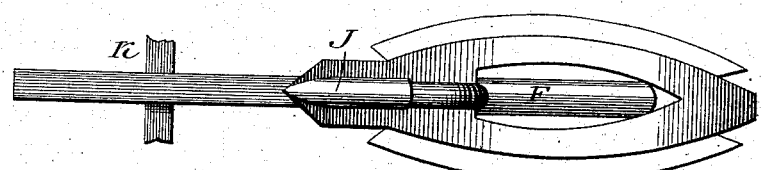

Figure 1 is a perspective view of the whole machine standing on top of the ground. Fig. 2 is a top view of the same. Fig. 3 is a bottom view, showing the excavator in its proper position on the mold-board.

The mold-board A is horizontally curved in such shape as to raise the ground enough to let the tile-drain in under it, and as it moves ahead it lets the ground down in its former position, with the exception of it (the ground) being slightly elevated on account of the space which the tile has taken up under the raised ground.

The guards B, C, D, and E serve to keep the sod and earth in such position that it will drop right back in its natural place after the plow has performed its work and passed from under it. The two outside guards, B and E, lean outward at an angle of about sixty degrees, and the two middle guards, C and D, are very nearly perpendicular.

The three colters *a*, *b*, and *c* serve to cut the sod before the plow commences to lift it. The two colters *a* and *b* regulate the width to be raised and cut, one on each side of the ditch, and are therefore set at an angle to correspond with the angle of the two outside guards, B and E. The middle colter, *c*, divides the earth in two equal parts, one of which passes over the mold-board A and between the guards B and C. The other part passes over mold-board A and between the guards D and E, whence they both meet, and are deposited in the ditch simultaneously. The object of dividing the earth in two equal parts is to give room for the tube or trough F, through which the drain-tile is fed, and by said tube placed in its proper place in the ditch. The tube F is made long enough to hold several pieces of tile-drain, and when the machine is in operation the tube is constantly kept full, so that the pressure or weight of the tile will force the bottom one down and backward in its proper position toward and against the preceding tile. When one tile is placed in the ditch by the machine, another one is deposited from above in the tube by the attendant, and so on as long as the plow is in motion.

The shoe or tube J is to form an excavation to fit the size of the tile used, and it is therefore secured to the mold-board in such a manner that it can readily be removed and another size put in its place. The said shoe may be made as shown in the drawings, which simply makes an impression in the ground of the required size, or it may be arranged so that it will cut a cavity and force the dirt up through the mold-board, and the dirt will thenceforth go with the loose earth to be deposited in the ditch.

The mold-board A is made of one piece of oblong steel, having in its center a longitudinal slit large enough to let the tube F through.

The guards B, C, D, and E are secured to the mold-board A by bolts or any other suitable device.

I intend to use a capstan or steam-engine or any other convenient power to propel my ditcher, and by attaching my power to the main beam G the plow will act very near the same as an ordinary plow in starting. It will keep going down into the earth until the wheels or truck K rest firmly on the ground, and its depth will be controlled by the regulating device shown at H, or by some other similar device.

I am aware that prior to my invention tile-drain ditching-machines have been made resting on a truck, in combination with a regulating device and a delivery-spout. I therefore do not claim such a combination, broadly; but What I do claim, and desire to secure by Letters Patent, is—

In a tile-drain ditching-machine, the curved mold-board A, having the central longitudinal slit or opening to receive the delivery-spout, in combination with guards B C D E, curved backward and outward from the front to the longitudinal center of the mold-board, thence backward and inward to the rear or meeting point, whereby the soil raised by said mold-board will be conducted to the rear of the machine and deposited in the ditch in rear of the delivery-spout, as set forth.

In testimony whereof I have signed my name to this specification in the presence of two subscribing witnesses.

WILLIAM P. B. DECKER.

Witnesses:
 J. L. STROCK,
 H. A. BLACK.